(12) United States Patent
Yoshida et al.

(10) Patent No.: US 9,165,494 B2
(45) Date of Patent: Oct. 20, 2015

(54) SIGNAL CONVERSION CIRCUIT AND MULTI-PRIMARY COLOR LIQUID CRYSTAL DISPLAY DEVICE COMPRISING SAME

(75) Inventors: Yuichi Yoshida, Osaka (JP); Tomohiko Mori, Osaka (JP); Kazunari Tomizawa, Osaka (JP); Kohzoh Nakamura, Osaka (JP); Shun Ueki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 188 days.

(21) Appl. No.: 13/976,150

(22) PCT Filed: Dec. 22, 2011

(86) PCT No.: PCT/JP2011/079919
§ 371 (c)(1),
(2), (4) Date: Jun. 26, 2013

(87) PCT Pub. No.: WO2012/090880
PCT Pub. Date: Jul. 5, 2012

(65) Prior Publication Data
US 2013/0271356 A1 Oct. 17, 2013

(30) Foreign Application Priority Data
Dec. 28, 2010 (JP) .................. 2010-292465

(51) Int. Cl.
*G09G 3/36* (2006.01)
*G09G 3/20* (2006.01)
*H04N 9/67* (2006.01)

(52) U.S. Cl.
CPC ............ *G09G 3/2003* (2013.01); *G09G 3/3611* (2013.01); *H04N 9/67* (2013.01); *G09G 2300/0452* (2013.01); *G09G 2320/0666* (2013.01); *G09G 2340/06* (2013.01)

(58) Field of Classification Search
CPC ....... G09G 3/36; G09G 3/3607; G09G 3/364; G09G 2340/06

USPC .................................................. 345/87–104
See application file for complete search history.

(56) References Cited

U.S. PATENT DOCUMENTS 6,661,488 B1 12/2003 Takeda et al.
6,710,825 B2 3/2004 Kubo et al.
(Continued)

FOREIGN PATENT DOCUMENTS

CN 101866624 A 10/2010
CN 102347009 A 2/2012
(Continued)

OTHER PUBLICATIONS

English translation of Official Communication issued in corresponding International Application PCT/JP2011/079919, mailed on Jul. 18, 2013.
(Continued)

*Primary Examiner* — Alexander Eisen
*Assistant Examiner* — Nelson Lam
(74) *Attorney, Agent, or Firm* — Keating & Bennett, LLP

(57) ABSTRACT

A signal conversion circuit (20) is used for a multiple-primary color liquid crystal display device (100) which performs color display using four primary colors of red displayed by a red-sub pixel (R), green displayed by green-sub pixel (G), blue displayed by blue-sub pixel (B), and yellow displayed by yellow-sub pixel (Ye), and converts an input three-primary color video signal into a multiple-primary color video signal corresponding to four primary colors. The signal conversion circuit (20) performs signal conversion such that a gray scale level of the yellow-sub pixel (Ye) is higher than a gray scale level of the green-sub pixel (G) in at least some cases from among cases in which a red gray-scale level r, a green gray-scale level g, and a blue gray-scale level b which are displayed by the three-primary color video signal satisfy a relationship of $r>g>b$.

15 Claims, 10 Drawing Sheets

(56) References Cited

U.S. PATENT DOCUMENTS

| | | |
|---|---|---|
| 6,865,292 B1 | 3/2005 | Kagawa et al. |
| 6,952,252 B2 | 10/2005 | Nakanishi |
| 6,977,704 B2 | 12/2005 | Kataoka |
| 7,268,757 B2 | 9/2007 | Ben-David et al. |
| 2005/0146492 A1* | 7/2005 | Baba et al. ............ 345/87 |
| 2005/0184998 A1* | 8/2005 | Yang et al. ............ 345/589 |
| 2005/0206979 A1* | 9/2005 | Tomizawa et al. ............ 358/518 |
| 2006/0055858 A1 | 3/2006 | Nakanishi et al. |
| 2008/0101692 A1 | 5/2008 | Tanase et al. |
| 2008/0238845 A1* | 10/2008 | Kanou ............ 345/87 |
| 2009/0135213 A1* | 5/2009 | Tomizawa et al. ............ 345/697 |
| 2009/0167657 A1* | 7/2009 | Tomizawa ............ 345/88 |
| 2009/0295839 A1* | 12/2009 | Furukawa et al. ............ 345/690 |
| 2010/0091032 A1* | 4/2010 | Ueki et al. ............ 345/590 |
| 2010/0265281 A1 | 10/2010 | Furukawa et al. |
| 2011/0037929 A1* | 2/2011 | Roth et al. ............ 349/106 |
| 2011/0128309 A1* | 6/2011 | Miyazaki et al. ............ 345/690 |
| 2011/0210911 A1* | 9/2011 | Nakamura et al. ............ 345/88 |
| 2011/0227965 A1* | 9/2011 | Mori et al. ............ 345/690 |
| 2011/0254759 A1 | 10/2011 | Mori et al. |
| 2012/0026210 A1 | 2/2012 | Yano et al. |
| 2012/0050340 A1* | 3/2012 | Liao et al. ............ 345/690 |
| 2012/0206326 A1* | 8/2012 | Nakamura et al. ............ 345/88 |
| 2012/0281033 A1* | 11/2012 | Yoshida et al. ............ 345/694 |

FOREIGN PATENT DOCUMENTS

| | | |
|---|---|---|
| JP | 11-242225 A | 9/1999 |
| JP | 2000-287074 A | 10/2000 |
| JP | 2001-209047 A | 8/2001 |
| JP | 2002-357830 A | 12/2002 |
| JP | 2003-043525 A | 2/2003 |
| JP | 2003-177418 A | 6/2003 |
| JP | 2004-529396 A | 9/2004 |
| JP | 2006-078968 A | 3/2006 |
| JP | 2008-107507 A | 5/2008 |
| JP | 2010-237697 A | 10/2010 |
| WO | 2010/073693 A1 | 7/2010 |

OTHER PUBLICATIONS

Official Communication issued in International Patent Application No. PCT/JP2011/079919, mailed on Jan. 31, 2012.

Pointer, "The Gamut of Real Surface Colours", Color Research and Application, vol. 5, No. 3, 1980, pp. 145-155.

* cited by examiner

SIGNAL CONVERSION CIRCUIT AND MULTI-PRIMARY COLOR LIQUID CRYSTAL DISPLAY DEVICE COMPRISING SAME

TECHNICAL FIELD

The present invention relates to a liquid crystal display device and, in particular, relates to a multiple-primary color liquid crystal display device. In addition, the present invention relates to a signal conversion circuit which is used for the multiple-primary color liquid crystal display device.

BACKGROUND ART

Recently, various kinds of display devices which include a liquid crystal display device have been used for various purposes. In a general display device, a single pixel includes three sub pixels for displaying red, green and blue which are the three primary colors of light, and thus producing a color display is possible.

However, a conventional display device has a problem in that a displayable color range (called a "color reproduction range") is narrow. FIG. 14 illustrates the color reproduction range of a conventional display device which performs display using three primary colors. FIG. 14 is an xy chromaticity diagram of an XYZ colorimetric system, and a triangle, which includes three points corresponding to three primary colors of red, green, and blue as apexes, indicates the color reproduction range. In addition, in the drawing, various object colors which are clarified using pointers and which exist in the nature (refer to NPL 1) are plotted using x marks. As understood from FIG. 14, the object colors which are not included in the color reproduction range exist, and it is difficult for a display device which performs display using three primary colors to display some of the object colors.

Here, in order to increase the color reproduction range of the display device, a method for increasing the number of primary colors, which are used for display, by four or more has been proposed (refer to PTL 1).

For example, like a liquid crystal display device 600 illustrated in FIG. 15, a single pixel P includes four sub pixels of a red-sub pixel R, a green-sub pixel G, a blue-sub pixel B and a yellow-sub pixel Ye, and thus it is possible to increase the color reproduction range. Otherwise, similar to a liquid crystal display device 700 illustrated in FIG. 16, a single pixel P may include five sub pixels of a red-sub pixel R, a green-sub pixel G, a blue-sub pixel B, a cyan-sub pixel C, and a yellow-sub pixel Ye, and, like a liquid crystal display device 800 illustrated in FIG. 17, a single pixel P may include six sub pixels of a red-sub pixel R, a green-sub pixel G, a blue-sub pixel B, a cyan-sub pixel C, a magenta-sub pixel M, and a yellow-sub pixel Ye. When four or more primary colors are used, it is possible to increase the color reproduction range, compared with the conventional liquid crystal display device which performs display using the three primary colors. In the specification, a display device which performs display using four or more primary colors is generally called a "multiple-primary color display device", and a liquid crystal display device which performs display using four or more primary colors is generally called a "multiple-primary color liquid crystal display device". In addition, a general display device according to the related art which performs display using the three primary colors is generally called a "three-primary color display device", and a liquid crystal display device which performs display using the three primary colors is generally called a "three-primary color liquid crystal display device".

An RGB format, a YCrCb format, or the like is a general format of a video signal which is input to the three-primary color display device. Since a video signal which has the format includes three parameters (in other words, a 3D signal), the brightness of the three primary colors (red, green, and blue) which are used for display is unambiguously determined.

In order to perform display using the multiple-primary color display device, it is necessary to convert the video signal which has a format for the three-primary color display device into a video signal which includes a larger number of parameters (four or more parameters). The video signal which corresponds to the four or more primary colors is called a "multiple-primary color video signal" in the specification.

CITATION LIST

Patent Literature

PTL 1: Japanese Unexamined Patent Application Publication (Translation of PCT Application) No. 2004-529396

Non Patent Literature

NPL 1: Pointer, M. R., "The Gamut of Real Surface Colors", Color Research and Application, Vol. 5, No. 3, pp. 145-155 (1980)

SUMMARY OF INVENTION

Technical Problem

However, in a case in which colors, which are displayed by the video signal which has the format for the three-primary color display device (herein after, called a "three-primary color video signal"), are displayed using four or more primary colors, the brightness of each of the primary colors is not unambiguously determined and a large number of combinations of the brightness exist. That is, a method for converting the three-primary color video signal into a multiple-primary color video signal is not usual, and has markedly high randomness (a degree of freedom). Therefore, a signal conversion method which is optimal for the multiple-primary color display device has not been found yet. In particular, a liquid crystal display device which uses the optical properties of liquid crystal consequently has display properties which are different from those of other display devices. However, a signal conversion method which takes into consideration the display properties of the multiple-primary color liquid crystal display device has not been found yet.

The present invention has been made to solve the above problem, and an object of the present invention is to provide a signal conversion circuit which is suitably used for a multiple-primary color liquid crystal display device, and a multiple-primary color liquid crystal display device which includes the signal conversion circuit.

Solution to Problem

A signal conversion circuit according to an embodiment of the present invention is used for a multiple-primary color liquid crystal display device that includes pixels each configured with a red-sub pixel, a green-sub pixel, a blue-sub pixel, and yellow-sub pixel, and that performs color display using four primary colors of red displayed by the red-sub pixel, green displayed by the green-sub pixel, blue displayed by the blue-sub pixel, and yellow displayed by the yellow-sub pixel, and which is configured to convert an input three-primary color video signal into a multiple-primary color video signal corresponding to the four primary colors. The signal conversion circuit performs signal conversion such that a gray scale level of the yellow-sub pixel is higher than a gray scale level of the green-sub pixel in at least some cases from among cases in which a red gray-scale level r, a green gray-scale level g, and a blue gray-scale level b which are displayed by the three-primary color video signal satisfy a relationship of r>g>b.

In a preferred embodiment, each of the red-sub pixel, the green-sub pixel, the blue-sub pixel, and the yellow-sub pixel may perform display 256 gray-scale levels from a gray scale level of 0 to a gray scale level of 255, each of the red gray-scale level r, the green gray-scale level g, and the blue gray-scale level b, which are displayed by the three-primary color video signal, may be equal to or greater than 0 and equal to or less than 255, at least some cases may include a case in which the red gray-scale level r is 255 and the green gray-scale level g is equal to or greater than 1 and equal to or less than 128, and in a case in which the red gray-scale level r is 255 and the green gray-scale level g is equal to or greater than 1 and equal to or less than 128, the signal conversion may be performed such that the gray scale level of the green-sub pixel becomes equal to or less than 80.

In a preferred embodiment, in the case in which the red gray-scale level r is 255 and the green gray-scale level g is equal to or greater than 1 and equal to or less than 128, the signal conversion may be performed such that the gray scale level of the green-sub pixel becomes 0.

In a preferred embodiment, each of the red-sub pixel, the green-sub pixel, the blue-sub pixel, and the yellow-sub pixel may perform display 256 gray-scale levels from the gray scale level of 0 to the gray scale level of 255, each of the red gray-scale level r, the green gray-scale level g, and the blue gray-scale level b, which are displayed by the three-primary color video signal, may be equal to or greater than 0 and equal to or less than 255, at least some cases may include a case in which the red gray-scale level r is 80 and the green gray-scale level g is equal to or greater than 1 and equal to or less than 40, and in a case in which the red gray-scale level r is 80 and the green gray-scale level g is equal to or greater than 1 and equal to or less than 40, the signal conversion may be performed such that the gray scale level of the green-sub pixel becomes equal to or less than 25.

In a preferred embodiment, in the case in which the red gray-scale level r is 80 and the green gray-scale level g is equal to or greater than 1 and equal to or less than 40, the signal conversion may be performed such that the gray scale level of the green-sub pixel becomes 0.

In a preferred embodiment, in at least some cases, the signal conversion circuit according to the invention may perform the signal conversion such that a color, obtained when the pixel is viewed from a front direction when display is performed based on the multiple-primary color video signal, may be substantially equal to a color obtained when the pixel is viewed from a 60° oblique direction.

In a preferred embodiment, the signal conversion circuit according to the invention may include a multiple-primary color conversion unit that generates the multiple-primary color video signal based on the input three-primary color video signal; and a correction unit that corrects a red gray-scale level $r_1$, green gray-scale level $g_1$, and a yellow gray-scale level $y_1$ which are displayed by the multiple-primary color video signal obtained by the multiple-primary color conversion unit.

In a preferred embodiment, the multiple-primary color conversion unit may include a color component extraction unit which extracts a red component, a green component, a blue component, a yellow component, a magenta component, a cyan component, and a white component from the input three-primary color video signal.

In a preferred embodiment, the signal conversion circuit according to the invention may further include a look-up table that includes a correction value corresponding to a gray scale level $y_0$ of the yellow component which is extracted by the color component extraction unit. The correction unit may correct the red gray-scale level $r_1$, the green gray-scale level $g_1$, and the yellow gray-scale level $y_1$ with reference to the look-up table.

In a preferred embodiment, at least some cases in which the signal conversion is performed such that the gray scale level of the yellow-sub pixel is higher than the gray scale level of the green-sub pixel may include a case in which the gray scale level $y_0$ of the yellow component extracted by the color component extraction unit is equal to or greater than 1 and equal to or less than 200.

A multiple-primary color liquid crystal display device according to an embodiment of the present invention includes: a signal conversion circuit having the above configuration; and a liquid crystal display panel to which a multiple-primary color video signal generated by the signal conversion circuit is sent.

In a preferred embodiment, the liquid crystal display panel may include a vertical alignment type liquid crystal layer, and includes the red-sub pixel, the green-sub pixel, the blue-sub pixel, and the yellow-sub pixel. In each of the red-sub pixel, the green-sub pixel, the blue-sub pixel, and the yellow-sub pixel, when a predetermined voltage is applied to the liquid crystal layer, liquid crystal molecules which are included in the liquid crystal layer may incline to a plurality of orientations.

Advantageous Effects of Invention

According to embodiments of the present invention, there is provided a signal conversion circuit which is suitably used for a multiple-primary color liquid crystal display device, and a multiple-primary color liquid crystal display device which includes the signal conversion circuit.

DESCRIPTION OF EMBODIMENTS

The inventors have given a great deal of consideration to a multiple-primary color liquid crystal display device which configures a single pixel using four sub pixels obtained by adding a yellow-sub pixel to a red-sub pixel, a green-sub pixel, and a blue-sub pixel, that is, which performs color display using four primary colors. As a result, a phenomenon in which, if a predetermined color is displayed using pixels, a color observed from the oblique direction is greatly different from a color observed from the front direction, is confirmed.

Figure 18:
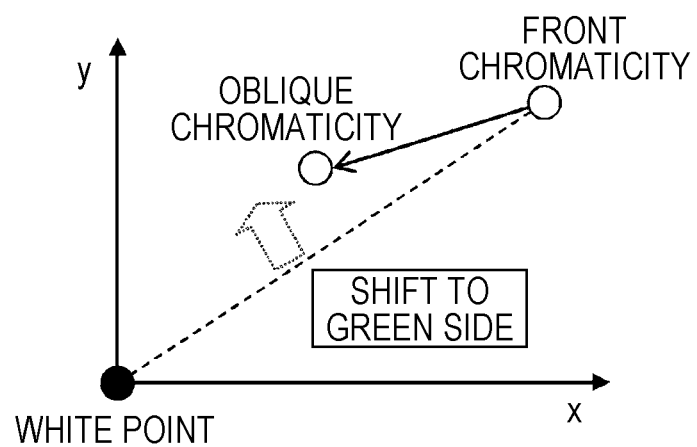
FIG. 18 is an xy chromaticity diagram in which a white point is used as an origin, and illustrates an example of undesirable chromaticity shift.

More specifically, if a so-called skin color (which may be called "light orange" or "pale orange") or a color having chromaticity which is close to the skin color is displayed, a color displayed using pixels is greenish when observed from the oblique direction. FIG. 18 schematically illustrates the phenomenon. FIG. 18 is an xy chromaticity diagram which uses a white point (chromaticity obtained when displaying white) as an origin, and illustrates chromaticity (front chromaticity) obtained when pixels displaying the skin color are viewed from the front direction and chromaticity (oblique chromaticity) obtained when the pixels are viewed from the oblique direction.

As illustrated in FIG. 18, the front chromaticity is greatly different from the oblique chromaticity. In addition, the oblique chromaticity is positioned further on the upper side (the positive direction on a Y axis) than a line which connects the front chromaticity with the white point. This means that the oblique chromaticity is shifted (deviated) to a green side compared with the front chromaticity.

As a result of the great deal of consideration to a signal conversion method which is used for the multiple-primary color liquid crystal display device, the inventors have found a signal conversion method which can suppress the deterioration of visual quality due to the shift of the above-described chromaticity to the green side.

Hereinafter, embodiments of the present invention will be described with reference to the accompanying drawings. Meanwhile, the present invention is not limited to the embodiments below.

Figure 1:
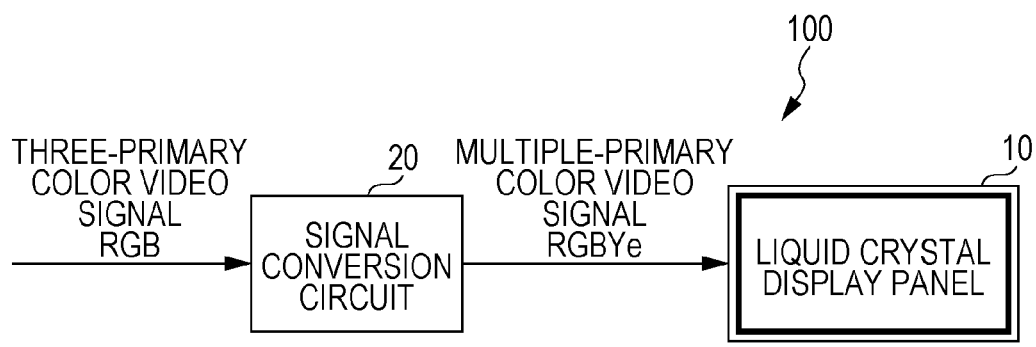
FIG. 1 is a block diagram schematically illustrating a liquid crystal display device 100 according to a preferred embodiment of the present invention.

FIG. 1 illustrates a liquid crystal display device 100 according to an embodiment. The liquid crystal display device 100 includes a liquid crystal display panel 10 and a signal conversion circuit 20 as illustrated in FIG. 1.

Figure 2:
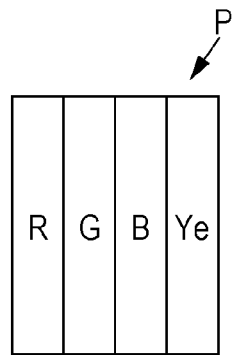
FIG. 2(a) and FIG. 2(b) are views schematically illustrating a single pixel P of the liquid crystal display device 100.
Figure 2:
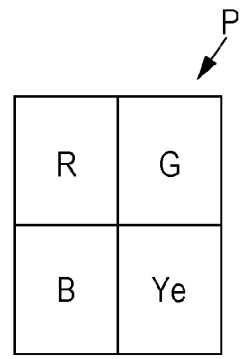

The liquid crystal display panel 10 includes a plurality of pixels which are arranged in a matrix shape. Each of the plurality of pixels is configured by four sub pixels. FIG. 2(a) illustrates a detailed configuration of a single pixel P of the liquid crystal display panel 10. As illustrated in FIG. 2(a), the single pixel P is configured by a red-sub pixel R which displays red, a green-sub pixel G which displays green, a blue-sub pixel B which displays blue, and a yellow-sub pixel Ye which displays yellow.

Although FIG. 2(a) illustrates the configuration in which four sub pixels are arranged in one row and four columns in the pixel P, the red-sub pixel R, the green-sub pixel G, the blue-sub pixel B, and the yellow-sub pixel Ye may be arranged in two rows and two columns (i.e., in the matrix shape) in the pixel P, as illustrated in FIG. 2(b).

Meanwhile, although FIG. 2(a) illustrates the configuration in which the red-sub pixel R, the green-sub pixel G, the blue-sub pixel B, and the yellow-sub pixel Ye are arranged in this order in the pixel P from the left to the right and FIG. 2(b) illustrates a configuration in which the red-sub pixel R, the green-sub pixel G, the yellow-sub pixel Ye, and the blue-sub pixel B are arranged in this order in the pixel P from the upper left in a clockwise fashion, the arrangement of the sub pixels in the pixel P is not limited thereto. The red-sub pixel R, the green-sub pixel G, the blue-sub pixel B, and the yellow-sub pixel Ye may be arranged in the pixel P in an arbitrary order.

As described above, the pixel P of the liquid crystal display device 100 is configured by four sub pixels of the red-sub pixel R, the green-sub pixel G, the blue-sub pixel B, and the yellow-sub pixel Ye. Therefore, the liquid crystal display device 100 is a multiple-primary color liquid crystal display device which performs color display using four primary colors of red which is displayed by the red-sub pixel R, green which is displayed by the green-sub pixel G, blue which is displayed by the blue-sub pixel B, and yellow which is displayed by the yellow-sub pixel Ye. Meanwhile, in the embodiment, the red-sub pixel R, the green-sub pixel G, the blue-sub pixel B, and the yellow-sub pixel Ye can perform display 256 gray scale levels from the gray scale level of 0 (the minimum gray scale level) to the gray scale level of 255 (the maximum gray scale level).

The signal conversion circuit 20 converts an input three-primary color video signal into a multiple-primary color video signal (four-color video signal) corresponding to four primary colors.

For example, the signal conversion circuit 20 converts a three-primary color video signal which has an RGB format and which indicates the brightness of each of the red, the green, and the blue into a multiple-primary color video signal which indicates the brightness of each of the red, the green, the blue, and the yellow. Meanwhile, the format of the three-primary color video signal is not limited to the RGB format, and may be an XYZ format, a YCrCb format, or the like. Even though the three-primary color video signal has any format, the three-primary color video signal directly or indirectly indicates a red gray-scale level r, a green gray-scale level g, and a blue gray-scale level b. When the three-primary color video signal is a digital signal in which 8 bits are assigned to each of the primary colors, each of the r, g, and b is an integer which is equal to or greater than 0 and equal to or less than 255.

A multiple-primary color video signal which is generated by the signal conversion circuit 20 is sent to the liquid crystal display panel 10, and a color in response to the multiple-primary color video signal is displayed by each pixel P. Various display modes can be used as the display mode of the liquid crystal display panel 10. For example, it is possible to suitably use a vertical alignment mode (VA mode) which may realize wide viewing angle properties.

For example, it is possible to use a Multi-domain Vertical Alignment (MVA) mode which is disclosed in Japanese Unexamined Patent Application Publication No. 11-242225 or a Continuous Pinwheel Alignment (CPA) mode which is disclosed in Japanese Unexamined Patent Application Publication No. 2003-43525 as the vertical alignment mode. The panel of the MVA mode or the CPA mode includes a vertical alignment type liquid crystal layer in which liquid crystal molecules are vertically aligned with respect to a substrate when a voltage is not applied, and wide viewing angle display is realized in such a way that the liquid crystal molecules are tilted in a plurality of orientations when a voltage is applied to each of the sub pixels.

In addition, it is preferable to use a Polymer Sustained Alignment Technology (PSA technology). The PSA technology is disclosed in, for example, Japanese Unexamined Patent Application Publication No. 2002-357830, Japanese Unexamined Patent Application Publication No. 2003-177418, and Japanese Unexamined Patent Application Publication No. 2006-78968. The PSA technology is a technology which controls the pretilt direction of liquid crystal molecules using a polymer which is generated by mixing a small amount of polymerizable compounds (for example, optical polymerizable monomer or oligomer) in a liquid crystal material, assembling liquid crystal cells, and irradiating active energy rays (for example, ultraviolet) to a polymerizable material in a state in which a predetermined voltage is applied to a liquid crystal layer. The orientation of the liquid crystal molecules obtained when the polymer is generated is maintained (stored) even after the voltage is taken off (a state in which the voltage is not applied). Here, a layer which is formed by the polymer is called an orientation maintenance layer. Although the orientation maintenance layer is formed on the surface of an oriented film (the side of the liquid crystal layer), it is not necessary to have a film shape which covers the surface of the oriented film and may have a shape in which the particles of the polymer are discretely present. When the PSA technology is used, it is possible to improve the stability of orientation and response speed.

In the liquid crystal display device 100 according to the embodiment, when the signal conversion circuit 20 converts the three-primary color video signal into the multiple-primary color video signal, if a color displayed by the three-primary color video signal is a color included in a predetermined chromaticity range, the signal conversion circuit performs signal conversion such that the gray scale level of the green-sub pixel G and the gray scale level of the yellow-sub pixel Ye satisfy a predetermined relationship. More specifically, in at least some cases in which the red gray-scale level r, the green gray-scale level g, and the blue gray-scale level b which are displayed by the three-primary color video signal satisfy the relationship of r>g>b, the signal conversion circuit 20 performs the signal conversion such that the gray scale level of the yellow-sub pixel Ye is higher than the gray scale level of the green-sub pixel G. Therefore, when observed from the oblique direction, it is possible to suppress the chromaticity from shifting to a green side. Hereinafter, the reason for this will be described.

First, a basic algorithm in order to convert the three-primary color video signal into the multiple-primary color video signal will be described. Here, a simple example of the basic algorithm will be described.

First, seven color components, more specifically, a red component, green component, a blue component, a yellow component, a magenta component, a cyan component, and a white component are extracted from the input three-primary color video signal. The extraction of the color components is performed as below.

The three-primary color video signal is classified into six patterns based on the magnitude relationship between the red gray-scale level r, the green gray-scale level g, and the blue gray-scale level b. For example, the three-primary color video signal is classified into patterns (I) to (VI) below.

$$r > g > b \tag{I}$$

$$r \geq b \geq g \tag{II}$$

$$b > r \geq g \tag{III}$$

$$b > g > r \tag{IV}$$

$$g \geq b > r \tag{V}$$

$$g \geq r \geq b \tag{VI}$$

When it is assumed that the gray scale levels of the red component, the green component, the blue component, the yellow component, the magenta component, the cyan component, and the white component are set to $r_0$, $g_0$, $b_0$, $y_0$, $m_0$, $c_0$, and $w_0$, respectively, the gray scale levels of the respective color components are calculated as below for the respective patterns.

[Case of Pattern (I)]

In the case of r>g>b, as illustrated in FIG. 3(a), the difference between the red gray-scale level r and the green gray-scale level g becomes the gray scale level $r_0$ of the red component (i.e., $r_0 = r - g$). In addition, the difference between the green gray-scale level g and the blue gray-scale level b becomes the gray scale level $y_0$ of the yellow component (i.e., $y_0 = g - b$). Further, the blue gray-scale level b becomes the gray scale level $w_0$ of the white component (i.e., $w_0 = b$). The respective gray scale levels $g_0$, $b_0$, $m_0$, and $c_0$ of the green component, the blue component, the magenta component, and the cyan component become 0 (i.e., $g_0 = b_0 = m_0 = c_0 = 0$).

[Case of Pattern (II)]

In the case of r≥b≥g, as illustrated in FIG. 3(b), the difference between the red gray-scale level r and the blue gray-scale level b becomes the gray scale level $r_0$ of the red component (i.e., $r_0 = r - b$). In addition, the difference between the blue gray-scale level b and the green gray-scale level g becomes the gray scale level $m_0$ of the magenta component (i.e., $m_0 = b - g$). Further, the green gray-scale level p becomes the gray scale level $w_0$ of the white component (i.e., $w_0 = g$). The respective gray scale levels $g_0$, $b_0$, $y_0$, and $c_0$ of the green component, the blue component, the yellow component, and the cyan component become 0 (i.e., $g_0=b_0=y_0=c_0=0$).

[Case of Pattern (III)]

In the case of b>r≥g, as illustrated in FIG. 3(c), the difference between the blue gray-scale level b and the red gray-scale level r becomes the gray scale level $b_0$ of the blue component (i.e., $b_0=b-r$). In addition, the difference between the red gray-scale level r and the green gray-scale level g becomes the gray scale level $m_0$ of the magenta component (i.e., $m_0=r-g$). Further, the green gray-scale level g becomes the gray scale level $w_0$ of the white component (i.e., $w_0=g$). The respective gray scale levels $r_0$, $g_0$, $y_0$, and $c_0$ of the red component, the green component, yellow component, and the cyan component become 0 (i.e., $r_0=g_0=y_0=c_0=0$).

[Case of Pattern (IV)]

In the case of b>g>r, as illustrated in FIG. 3(d), the difference between the blue gray-scale level b and the green gray-scale level g becomes the gray scale level $b_0$ of the blue component (i.e., $b_0=b-g$). In addition, the difference between the green gray-scale level g and the red gray-scale level r becomes the gray scale level $c_0$ of the cyan component (i.e., $c_0=g-r$). Further, the red gray-scale level r becomes the gray scale level $w_0$ of the white component (i.e., $w_0=r$). The respective gray scale levels $r_0$, $g_0$, $y_0$, and $m_0$ of the red component, the green component, the yellow component, and the magenta component become 0 (i.e., $r_0=g_0=y_0=m_0=0$).

[Case of Pattern (V)]

In the case of g≥b>r, as illustrated in FIG. 3(e), the difference between the green gray-scale level g and the blue gray-scale level b becomes the gray scale level $g_0$ of the green component (i.e., $g_0=g-b$). In addition, the difference between the blue gray-scale level b and the red gray-scale level r becomes the gray scale level $c_0$ of the cyan component (i.e., $c_0=b-r$). Further, the red gray-scale level r becomes the gray scale level $w_0$ of the white component (i.e., $w_0=r$). The respective gray scale levels $r_0$, $b_0$, $y_0$, and $m_0$ of the red component, the blue component, the yellow component, and the magenta component become 0 (i.e., $r_0=b_0=y_0=m_0=0$).

[Case of Pattern (VI)]

In the case of g≥r≥b, as illustrated in FIG. 3(f), the difference between the green gray-scale level g and the red gray-scale level r becomes the gray scale level $g_0$ of the green component (i.e., $g_0=g-r$). In addition, the difference between the red gray-scale level r and the blue gray-scale level b becomes the gray scale level $y_0$ of the yellow component (i.e., $y_0=r-b$). Further, the blue gray-scale level b becomes the gray scale level $w_0$ of the white component (i.e., $w_0=b$). The respective gray scale levels $r_0$, $b_0$, $m_0$, and $c_0$ of the red component, the blue component, the magenta component and the cyan component become 0 (i.e., $r_0=b_0=m_0=c_0=0$).

The gray scale levels of the respective color components calculated as described above are sorted into relevant sub pixels. The gray scale level $r_0$ of the red component is sorted into a red-sub pixel R which is a sub pixel contributing to red display. The gray scale level $g_0$ of the green component is sorted into a green-sub pixel G which is a sub pixel contributing to green display. The gray scale level $b_0$ of the blue component is sorted into a blue-sub pixel B which is a sub pixel contributing to blue display. The gray scale level $y_0$ of the yellow component is sorted into the red-sub pixel R, the green-sub pixel G, and a yellow-sub pixel Ye which are sub pixels contributing to yellow display. The gray scale level $m_0$ of the magenta component is sorted into the red-sub pixel R and the blue-sub pixel B which are sub pixels contributing to magenta display. The gray scale level $c_0$ of the cyan component is sorted into the green-sub pixel G and the blue-sub pixel B which are sub pixels contributing to cyan display. The gray scale level $w_0$ of the white component is sorted into the red-sub pixel R, the green-sub pixel G, the blue-sub pixel B, and the yellow-sub pixel Ye (that is, all the sub pixels) which are sub pixels contributing to white display.

Therefore, if it is assumed that the gray scale levels (output gray scale levels) of red, green, blue and yellow which are indicated by the multiple-primary color video signal are set to $r_1$, $g_1$, $b_1$, and $y_1$, respectively, the output gray scale levels $r_1$, $g_1$, $b_1$ and $y_1$ of red, green, blue, and yellow are expressed as the following Equations (1) to (4):

$$r_1=r_0+y_0+m_0+w_0 \quad (1)$$

$$g_1=g_0+y_0+c_0+w_0 \quad (2)$$

$$b_1=b_0+m_0+c_0+w_0 \quad (3)$$

$$y_1=y_0+w_0 \quad (4)$$

Figure 4:
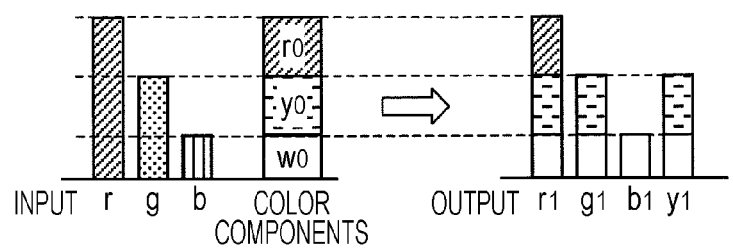
FIG. 4 is a view illustrating an example of the sorting of the gray scale levels of the extracted color components.

FIG. 4 schematically illustrates gray scale levels sorting in the case of pattern (I) (that is, in the case of r>g>b). In this case, color components which are extracted from the input three-primary color video signal are the red component, the yellow component, and the white component as illustrated on the left of FIG. 4. Therefore, the red output gray scale level $r_1$ is the sum of the gray scale level $r_0$ of the red component, the gray scale level $y_0$ of the yellow component and the gray scale level $w_0$ of the white component (i.e., $r_1=r_0+y_0+w_0$) as illustrated on the right of FIG. 4. In the same manner, the green output gray scale level $g_1$ is the sum of the gray scale level $y_0$ of the yellow component and the gray scale level $w_0$ of the white component (i.e., $g_1=y_0+w_0$). In addition, the blue output gray scale level $b_1$ is the gray scale level $w_0$ of the white component (i.e., $b_1=w_0$), and the yellow output gray scale level $y_1$ is the sum of the gray scale level $y_0$ of the yellow component and the gray scale level $w_0$ of the white component (i.e., $y_1=y_0+w_0$).

As described above, according to the basic algorithm, in the case of r>g>b, the green output gray scale level $g_1$ is equal to the yellow output gray scale level $y_1$ (i.e., $g_1=y_1=y_0+w_0$). Therefore, if display is performed based on the multiple-primary color video signal which is generated according to the basic algorithm, the gray scale level of the green-sub pixel G is equal to the gray scale level of the yellow-sub pixel Ye. In addition, in the case of r>g>b, the blue output gray scale level $b_1$ becomes the minimum as understood from FIG. 4. Therefore, in the case of r>g>b, display is performed by mainly using the red-sub pixel R, the green-sub pixel G, and the yellow-sub pixel Ye.

However, if display is performed according to the above-described basic algorithm, in the case of r>g>b, chromaticity shifts to the green side when observed from the oblique direction, and thus the visual quality is deteriorated. In the liquid crystal display device, when observed from the oblique direction, a phenomenon where display brightness is higher than original display brightness may occur (in the VA mode, called "whiten"). In the multiple-primary color liquid crystal display device which performs color display using four primary colors, the rising ratio of the brightness of the red-sub pixel is lower than the rising ratio of the brightness of other sub pixels, and thus chromaticity shifts to the green side.

Figure 5:
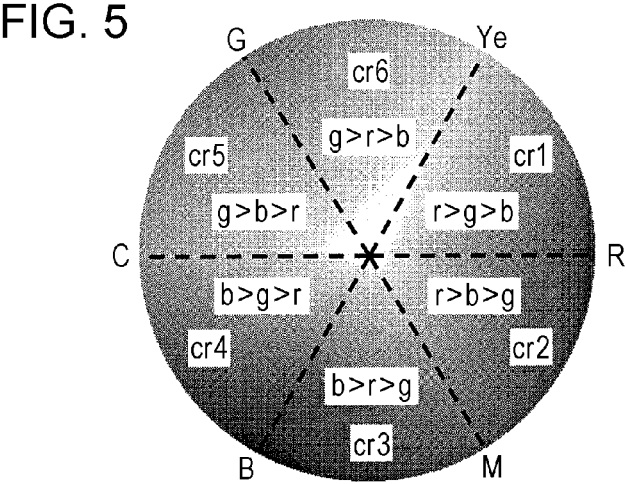
FIG. 5 is a view illustrating the magnitude relationships between the red gray-scale level r, the green gray-scale level g and the blue gray-scale level b, and the relationship between chromaticity ranges cr1 to cr6.

The color which is displayed by the three-primary color video signal is classified into six chromaticity ranges cr1 to cr6 based on the chromaticity, as illustrated in FIG. 5. The chromaticity range cr1 is a range in which the red gray-scale level r, the green gray-scale level g, and the blue gray-scale level b which are displayed by the three-primary color video signal satisfy the relationship of r>g>b. In the same manner, the chromaticity ranges cr2, cr3, cr4, cr5, and cr6 are ranges in which the relationships of r>b>g, b>r>g, b>g>r, g>b>r, and g>r>b are satisfied. The skin color or the color, the chromaticity of which is close to the skin color (that is, the color in which chromaticity shift is generated to the green side when observed from the oblique direction), is positioned in the chromaticity range cr1 (a range which satisfies the relationship of r>g>b) of the chromaticity ranges cr1 to cr6.

The signal conversion circuit 20 of the liquid crystal display device 100 according to the embodiment performs signal conversion such that the gray scale level of the yellow-sub pixel Ye is higher than the gray scale level of the green-sub pixel G in at least some cases in the case of r>g>b (that is, at least some ranges in the chromaticity range cr1). Therefore, compared with the case complying with the above-described basic algorithm (that is, when the gray scale level of the yellow-sub pixel Ye is equal to the gray scale level of the green-sub pixel G), it is possible to suppress chromaticity from shifting to the green side when observed from the oblique direction. Therefore, the deterioration of the visual quality is suppressed, and thus high-definition display is realized.

From the viewpoint of sufficient suppression of the deterioration of the display quality, it is preferable to perform the signal conversion as described above as in many cases in which the red gray-scale level r, the green gray-scale level g, and the blue gray-scale level b satisfy the relationship of r>g>b as possible (that is, as wide a range of the chromaticity range cr1 as possible). However, when the brightness of the color which is displayed by the pixel P is sufficiently high (that is, when displaying halftone of high gray scale), chromaticity shift may not be a problem, and thus it is not necessary to perform the signal conversion as described above in this case. For example, as will be described later, in a configuration in which the signal conversion circuit 20 first extracts color components like the basic algorithm, the signal conversion is performed such that the gray scale level of the yellow-sub pixel Ye is higher than the gray scale level of the green-sub pixel G when the gray scale level $y_0$ of the yellow component is equal to or greater than 1 and equal to or less than 200, and thus it is possible to sufficiently suppress the deterioration of visual quality for a practical purpose.

Here, a detailed example of the relationship between the gray scale level of the yellow-sub pixel Ye and the gray scale level of the green-sub pixel G will be described.

Figure 6:
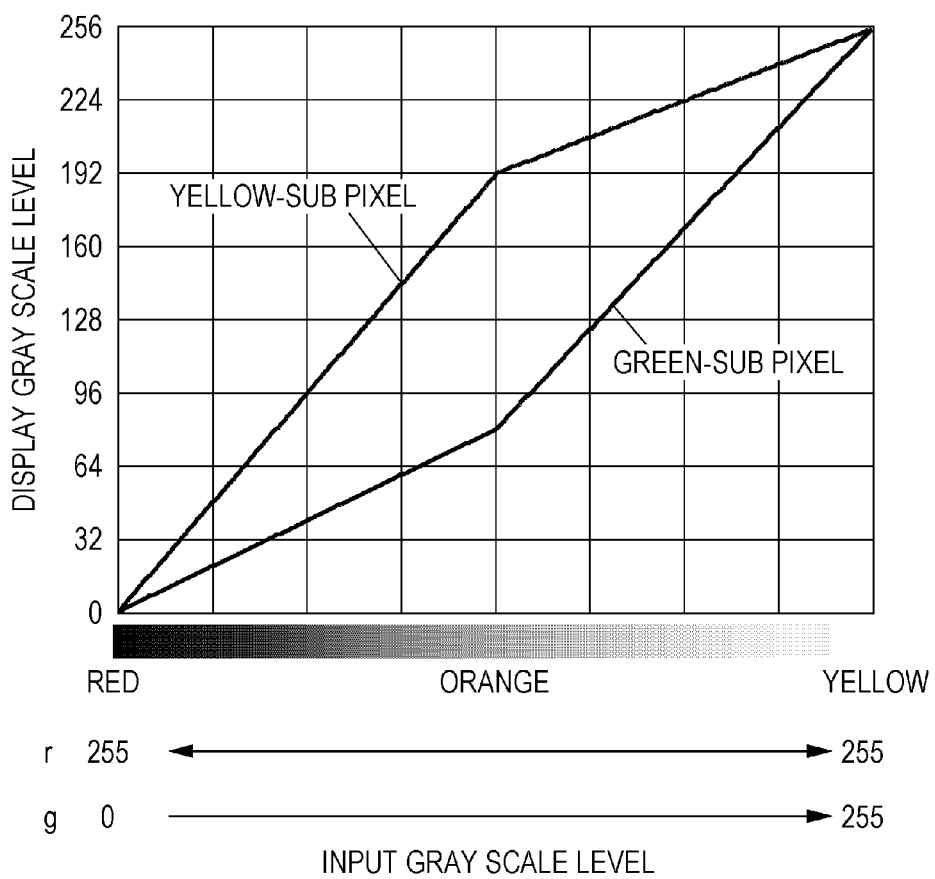
FIG. 6 is a graph illustrating an example of the relationship between the gray scale level of a yellow-sub pixel Ye and the gray scale level of a green-sub pixel G in an input gray scale range (r, g, b) from (255, 0, 0) to (255, 255, 0).

FIG. 6 illustrates an example of the relationship between the gray scale level of the yellow-sub pixel Ye and the gray scale level of the green-sub pixel G. FIG. 6 is a graph illustrating the relationship between the gray scale level of the yellow-sub pixel Ye and the gray scale level of the green-sub pixel G in the input gray scale levels (the red gray-scale level r, the green gray-scale level g, and the blue gray-scale level b which are displayed by the three-primary color video signal) from (r, g, b)=(255, 0, 0) to (255, 255, 0). The color which is displayed by the pixel P changes to yellow from red through orange while moving from the left to the right in the graph in FIG. 6.

In the example illustrated in FIG. 6, the gray scale level of the yellow-sub pixel Ye is higher than the gray scale level of the green-sub pixel G in almost all ranges (all the ranges except when g is 0 and 255). In addition, in a case of an input gray scale corresponding to orange, i.e., in a case of (r, g, b)=(255, 128, 0), the gray scale level of the green-sub pixel G is a gray scale level of 80.

From the viewpoint of sufficient suppression of the deterioration of visual quality, it is preferable that the gray scale level of the green-sub pixel G be equal to or less than the gray scale level of 80 when the red gray-scale level r is 255 and the green gray-scale level g is equal to or greater than 1 and equal to or less than 128. FIG. 6 illustrates one example in which the condition is satisfied. Meanwhile, although FIG. 6 illustrates a case in which the blue gray-scale level b is 0, it is preferable to satisfy the condition regardless of the blue gray-scale level b (although it is apparent that the blue gray-scale level b is included in the range of r>g>b).

Figure 7:
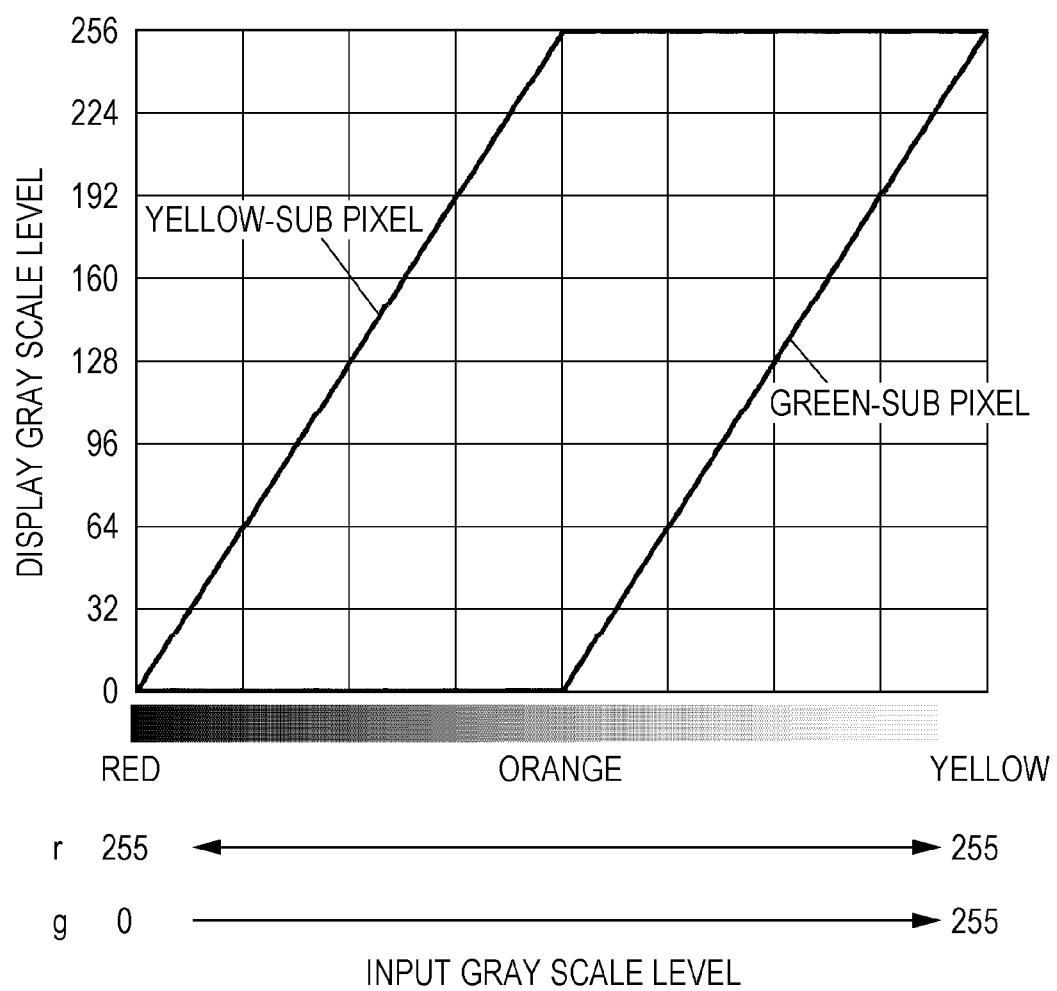
FIG. 7 is a graph illustrating an example of the relationship between the gray scale level of the yellow-sub pixel Ye and the gray scale level of the green-sub pixel G in an input gray scale range (r, g, b) from (255, 0, 0) to (255, 255, 0).

FIG. 7 illustrates another example of the relationship between the gray scale level of the yellow-sub pixel Ye and the gray scale level of the green-sub pixel G. Like FIG. 6, FIG. 7 is a graph illustrating the relationship between the gray scale level of the yellow-sub pixel Ye and the gray scale level of the green-sub pixel G in the range of the input gray scale levels from (r, g, b)=(255, 0, 0) to (255, 255, 0).

In the example illustrated in FIG. 7, the gray scale level of the yellow-sub pixel Ye is higher than the gray scale level of the green-sub pixel G in almost all ranges (all the ranges except when g is 0 and 255). In addition, in a range from an input gray scale level corresponding to red (i.e., (r, g, b)=(255, 0, 0)) to an input gray scale level corresponding to orange (i.e., (r, g, b)=(255, 128, 0)), the gray scale level of the green-sub pixel G is a gray scale level of 0.

From the viewpoint of sufficient suppression of the deterioration of visual quality, it is further preferable that the gray scale level of the green-sub pixel G be the gray scale level of 0 when the red gray-scale level r is 255 and the green gray-scale level g is equal to or greater than 1 and equal to or less than 128. FIG. 7 illustrates one example in which the condition is satisfied. Meanwhile, although FIG. 7 illustrates a case in which the blue gray-scale level b is 0, it is preferable to satisfy the condition regardless of the blue gray-scale level b (although it is apparent that the blue gray-scale level b is included in the range of r>g>b).

Figure 8:
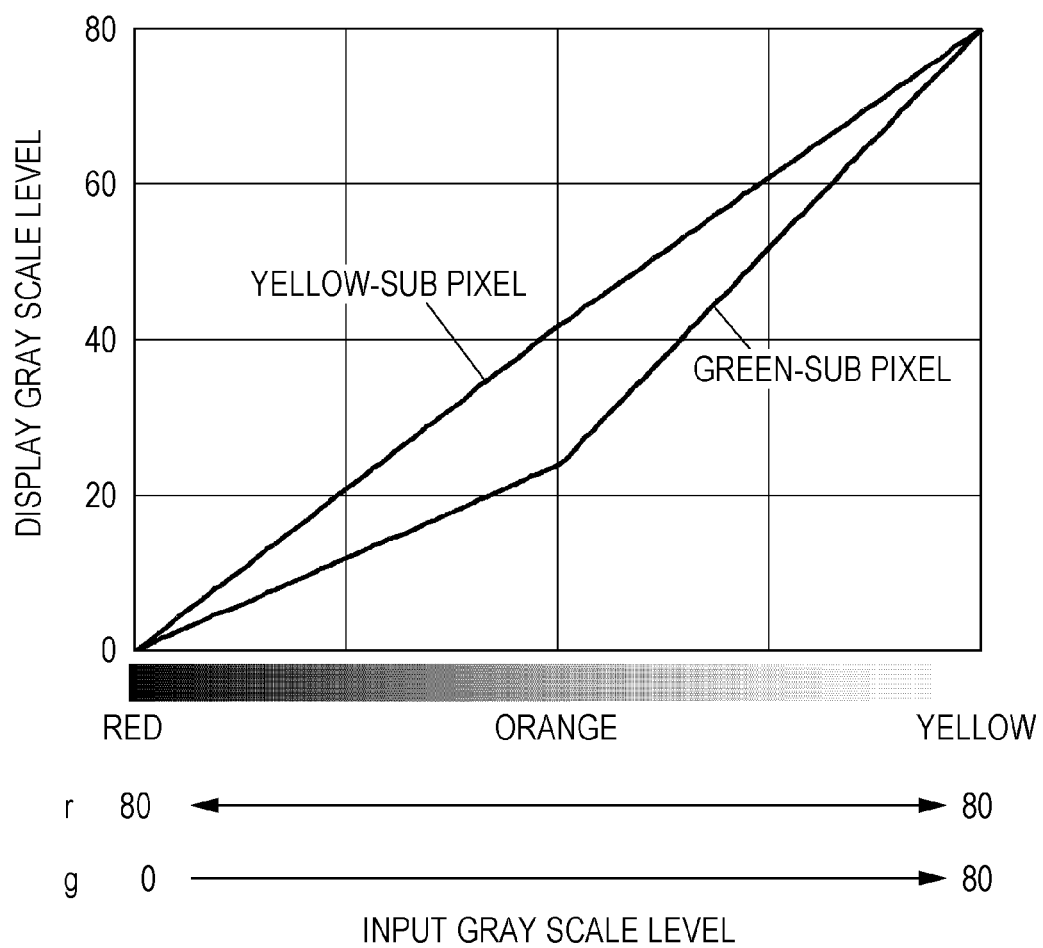
FIG. 8 is a graph illustrating an example of the relationship between the gray scale level of the yellow-sub pixel Ye and the gray scale level of the green-sub pixel G in an input gray scale range (r, g, b) from (80, 0, 0) to (80, 80, 0).

FIG. 8 illustrates another example of the relationship between the gray scale level of the yellow-sub pixel Ye and the gray scale level of the green-sub pixel G. FIG. 8 is a graph illustrating the relationship between the gray scale level of the yellow-sub pixel Ye and the gray scale level of the green-sub pixel G in the range of the input gray scale levels from (r, g, b)=(80, 0, 0) to (80, 80, 0). The color which is displayed by the pixel P changes to yellow from red through orange while moving from the left to the right in the graph in FIG. 8 (however, red, orange, and yellow are darker than the case illustrated in FIG. 6).

In the example illustrated in FIG. 8, the gray scale level of the yellow-sub pixel Ye is higher than the gray scale level of the green-sub pixel G in almost all ranges (all the ranges excepting that g is 0 and 80). In addition, in a case of an input gray scale level corresponding to orange, i.e., (r, g, b)=(80, 40, 0)), the gray scale level of the green-sub pixel G is a gray scale level of 25.

From the viewpoint of sufficient suppression of the deterioration of visual quality, it is preferable that the gray scale level of the green-sub pixel G be equal to or less than a gray scale level of 25 when the red gray-scale level r is 80 and the green gray-scale level g is equal to or greater than 1 and equal to or less than 40. FIG. 8 illustrates one example in which the condition is satisfied. Meanwhile, although FIG. 8 illustrates a case in which the blue gray-scale level b is 0, it is preferable to satisfy the condition regardless of the blue gray-scale level b (although it is apparent that the blue gray-scale level b is included in the range of r>g>b).

Figure 9:
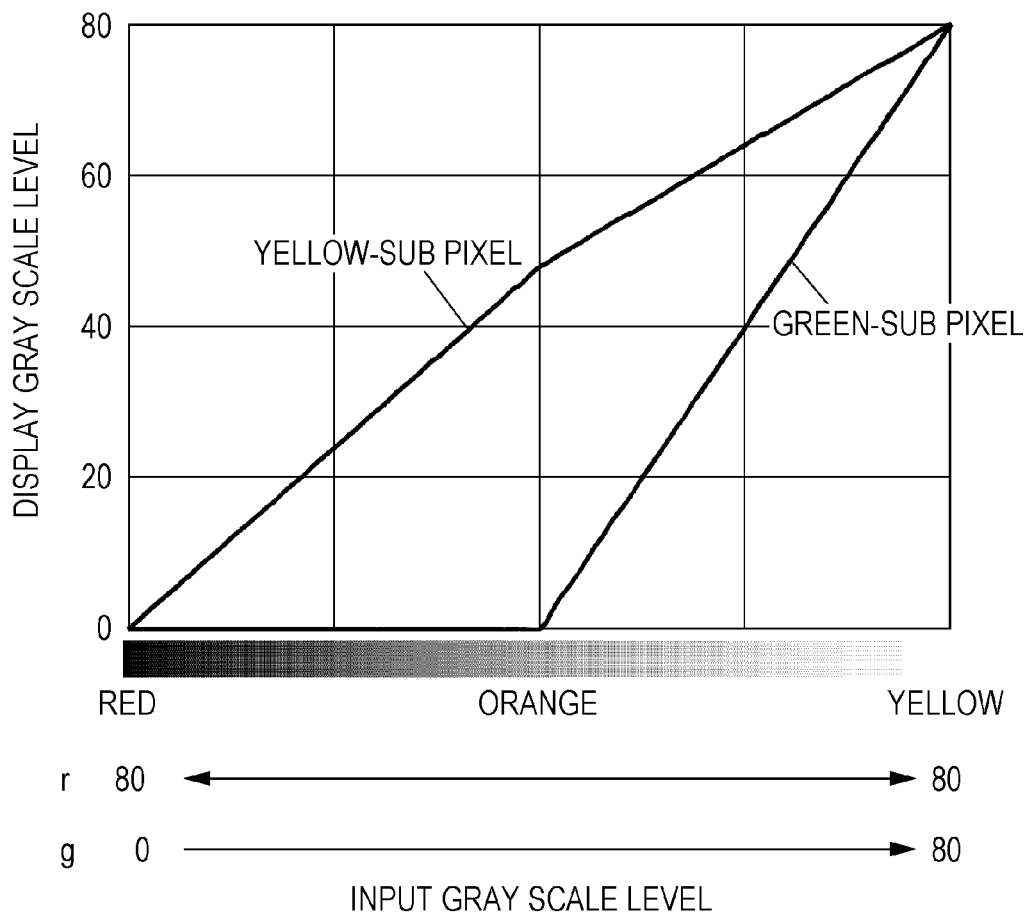
FIG. 9 is a graph illustrating an example of the relationship between the gray scale level of the yellow-sub pixel Ye and the gray scale level of the green-sub pixel G in an input gray scale range (r, g, b) from (80, 0, 0) to (80, 80, 0).

FIG. 9 illustrates another example of the relationship between the gray scale level of the yellow-sub pixel Ye and the gray scale level of the green-sub pixel G. Like FIG. 8, FIG. 9 is a graph illustrating the relationship between the gray scale level of the yellow-sub pixel Ye and the gray scale level of the green-sub pixel G in the range of the input gray scale levels from (r, g, b)=(80, 0, 0) to (80, 80, 0).

In the example illustrated in FIG. 9, the gray scale level of the yellow-sub pixel Ye is higher than the gray scale level of the green-sub pixel G in almost all ranges (all the ranges except when g is 0 and 80). In addition, in a range from an input gray scale level corresponding to red (i.e., (r, g, b)=(80, 0, 0)) to an input gray scale level corresponding to orange (i.e., (r, g, b)=(80, 40, 0)), the gray scale level of the green-sub pixel G is a gray scale level of 0.

From the viewpoint of sufficient suppression of the deterioration of visual quality, it is preferable that the gray scale level of the green-sub pixel G be a gray scale level of 0 when the red gray-scale level r is 80 and the green gray-scale level g is equal to or greater than 1 and equal to or less than 40. FIG. 9 illustrates one example in which the condition is satisfied. Meanwhile, although FIG. 9 illustrates a case in which the blue gray-scale level b is 0, it is preferable to satisfy the condition regardless of the blue gray-scale level b (although it is apparent that the blue gray-scale level b is included in the range of r>g>b).

Figure 10:
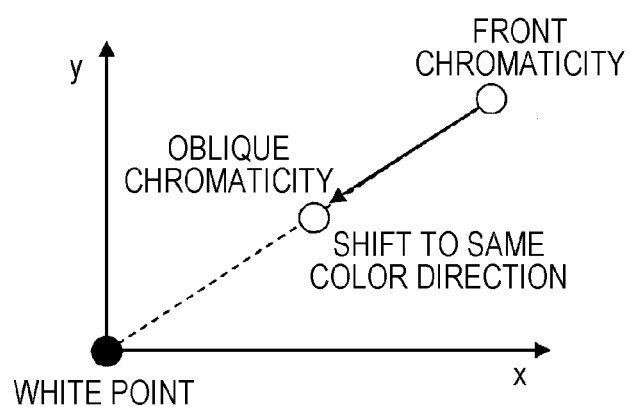
FIG. 10 is an xy chromaticity diagram using a white point as an origin, and illustrates an example of a preferred chromaticity shift.

Further, from the viewpoint that it is difficult to view chromaticity shift, as illustrated in FIG. 10, it is preferable to perform signal conversion such that oblique chromaticity is positioned on a line which connects the front chromaticity with the white point. In this case, the color obtained when the pixel P displayed based on the multiple-primary color video signal is viewed from the front direction is subsequently equal to the color of the pixel P obtained when viewed from the oblique direction. That is, the chromaticity shift in this case shifts to the same color direction. Therefore, it is difficult to view the chromaticity shift. It is difficult to position the oblique chromaticity on the line which connects the front chromaticity with the white point at all angles. However, if the oblique chromaticity is positioned on the line which connects the front chromaticity with the white point in the 60° oblique direction, that is, if signal conversion is performed on the pixel P such that the color viewed from the front direction is substantially equal to the color viewed from the 60° oblique direction, it is possible to sufficiently make the chromaticity shift be difficulty viewed.

As understood from the above description, the liquid crystal display device 100 according to the embodiment selects a combination in which chromaticity shift to the green side is suppressed from among combinations of the brightness of the sub pixels in order to display a color when the pixel P displays the color in the chromaticity range cr1. Here, the calculation of the combinations of the brightness of the sub pixels in order to display a certain color will be described.

When a certain color is displayed by the pixel P, it is possible to compute the brightness of the red-sub pixel R, the green-sub pixel G, and the blue-sub pixel B which is necessary for the arbitrary brightness of the yellow-sub pixel Ye based on the following Equation (5). Meanwhile, X, Y, and Z in Equation (5) are the tristimulus values of colors to be displayed, and $X_R, Y_R, Z_R, \ldots, Z_{Ye}$, are coefficients which are determined based on the tristimulus values of primary colors to be displayed by the respective sub pixels of the liquid crystal display panel 10.

[Expression 1]

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X - (X_{Ye} \times Ye) \\ Y - (Y_{Ye} \times Ye) \\ Z - (Z_{Ye} \times Ye) \end{pmatrix} \qquad (5)$$

The reason that the computation of the brightness is possible using Equation (5) is as follows:

The XYZ values of the color to be displayed are displayed using a matrix conversion equation for the brightness of the red-sub pixel R, the green-sub pixel G, the blue-sub pixel B, and the yellow-sub pixel Ye, as described in the following Equation (6).

[Expression 2]

$$\begin{pmatrix} X \\ Y \\ Z \end{pmatrix} = \begin{pmatrix} X_R & X_G & X_B & X_{Ye} \\ Y_R & Y_G & Y_B & Y_{Ye} \\ Z_R & Z_G & Z_B & Z_{Ye} \end{pmatrix} \begin{pmatrix} R \\ G \\ B \\ Ye \end{pmatrix} \qquad (6)$$

The right side of Equation (6) can be changed to the sum of the multiplication of the brightness of the red-sub pixel R, the green-sub pixel G, and the blue-sub pixel B and a conversion matrix having three rows and three columns and the multiplication of the brightness of the yellow-sub pixel Ye and a conversion matrix having three rows and a single column, as expressed in the following Equation (7). When Equation (7) is further changed, Equation (5) is acquired. Therefore, it is possible to compute the brightness of the red-sub pixel R, the green-sub pixel G, and the blue-sub pixel B by performing operation based on Equation (5).

[Expression 3]

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_{Ye} \\ Y_{Ye} \\ Z_{Ye} \end{pmatrix} Ye \qquad (7)$$

The following Table 1 describes a part of results obtained by actually calculating the combinations of the brightness of the sub pixels to display a certain color. Table 1 describes the gray scale levels of the red-sub pixel R, the green-sub pixel G, the blue-sub pixel B and the yellow-sub pixel Ye, and the x, y, and Y values of the chromaticity (front chromaticity) of the color which is displayed by the pixel P.

TABLE 1

| R | G | B | Ye | x | y | Y |
|---|---|---|----|---|---|---|
| 206 | 216 | 96 | 0 | 0.344922 | 0.390918 | 0.326849 |
| 206 | 216 | 96 | 1 | 0.344922 | 0.390919 | 0.326851 |
| 206 | 216 | 96 | 2 | 0.344923 | 0.390922 | 0.326859 |
| 206 | 216 | 96 | 3 | 0.344925 | 0.390927 | 0.326873 |
| . | . | . | . | . | . | . |
| . | . | . | . | . | . | . |
| . | . | . | . | . | . | . |
| 171 | 160 | 98 | 155 | 0.344525 | 0.390549 | 0.327731 |
| 170 | 159 | 98 | 156 | 0.344264 | 0.390631 | 0.327386 |
| 170 | 158 | 98 | 157 | 0.344682 | 0.390623 | 0.327764 |
| 169 | 157 | 98 | 158 | 0.344427 | 0.390728 | 0.327479 |
| 169 | 156 | 98 | 159 | 0.344846 | 0.390743 | 0.327912 |
| 168 | 155 | 98 | 160 | 0.344598 | 0.390871 | 0.327687 |

TABLE 1-continued

| R | G | B | Ye | x | y | Y |
|---|---|---|---|---|---|---|
| . | . | . | . | . | . | . |
| . | . | . | . | . | . | . |
| . | . | . | . | . | . | . |
| 142 | 103 | 99 | 195 | 0.344567 | 0.390656 | 0.327343 |
| 141 | 101 | 99 | 196 | 0.344549 | 0.390825 | 0.327488 |
| 140 | 99 | 99 | 197 | 0.344533 | 0.391021 | 0.327698 |
| 139 | 97 | 99 | 198 | 0.344519 | 0.391243 | 0.327974 |
| 138 | 94 | 99 | 199 | 0.344598 | 0.391079 | 0.327442 |
| 137 | 92 | 99 | 200 | 0.344586 | 0.391365 | 0.327871 |
| . | . | . | . | . | . | . |
| . | . | . | . | . | . | . |
| . | . | . | . | . | . | . |
| 121 | 18 | 99 | 215 | 0.34564 | 0.392273 | 0.327655 |

From Table 1, it is understood that a plurality of combinations of the gray scale levels have almost the same front chromaticity and that it is possible to display almost the same color using the pixel P. In addition, it is understood that it is possible to realize almost the same front chromaticity by lowering the gray scale levels of the red-sub pixel R and the green-sub pixel G as the gray scale level of the yellow-sub pixel Ye becomes high.

Figure 11:
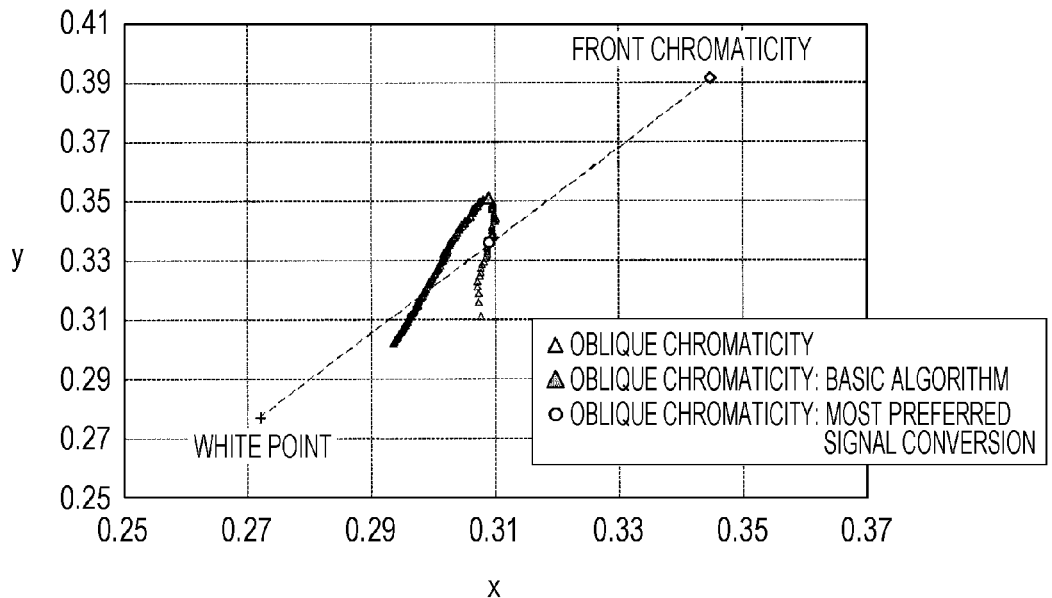
FIG. 11 is an xy chromaticity diagram plotting chromaticity (front chromaticity) obtained when a pixel P which displays a certain color is viewed from the front direction, chromaticity (oblique chromaticity) obtained when viewed from the 60° oblique direction, and the white point.

FIG. 11 illustrates chromaticity (oblique chromaticity) obtained when the pixel P, which performs display based on the above-described calculation results, is viewed from the 60° oblique direction. FIG. 11 is a xy chromaticity diagram. In addition to the oblique chromaticity, front chromaticity, and white point are plotted in FIG. 11.

As understood from FIG. 11, it is understood that the oblique chromaticity is different from the front chromaticity, and chromaticity is shifted (deviated) when observed from the oblique direction. As described in advance, a shift to the upper side further than the line which connects the front chromaticity with the white point (positive direction on the Y axis) means a shift to the green side, and the oblique chromaticity (indicated by gray triangle marks in the drawing) obtained based on the basic algorithm has a pronounced shift to the green side. In contrast, the oblique chromaticity (indicated by circular marks in the drawing) obtained when the most preferred signal conversion is performed is positioned on the line which connects the front chromaticity with the white point. Therefore, since the chromaticity shift in this case is the shift to the same color direction, the chromaticity shift is difficulty viewed when oblique observation is performed, and thus the visual quality is suppressed from being deteriorated.

Subsequently, an example of the detailed configuration of the signal conversion circuit 20 will be described.

Figure 12:
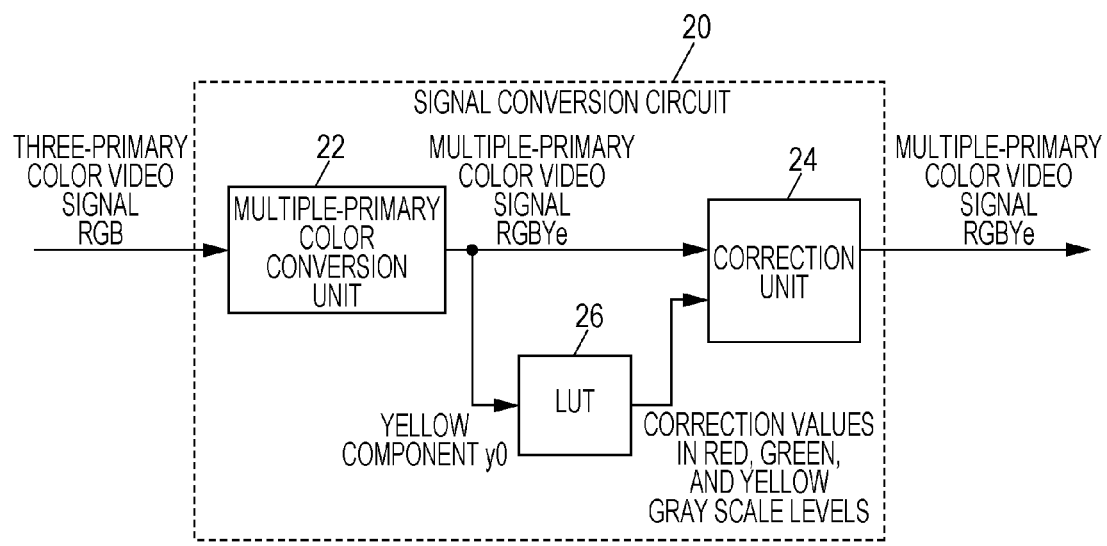
FIG. 12 is a block diagram illustrating an example of the preferred configuration of a signal conversion circuit 20 included in the liquid crystal display device 100.

FIG. 12 illustrates an example of a preferred configuration of the signal conversion circuit 20. The signal conversion circuit 20 illustrated in FIG. 12 includes a multiple-primary color conversion unit 22 and a correction unit 24. The signal conversion circuit 20 illustrated in FIG. 12 further includes a look-up table (LUT) 26.

Figure 13:
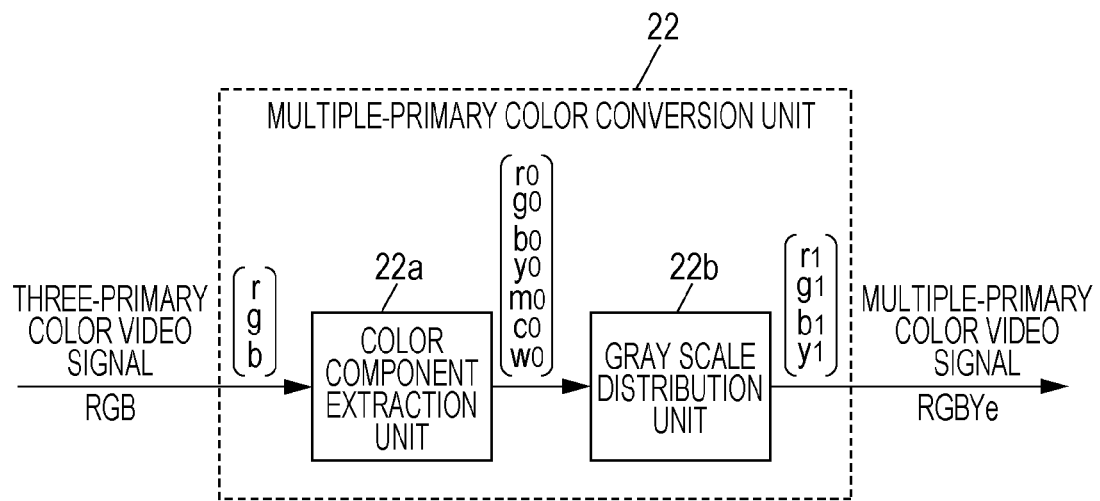
FIG. 13 is a block diagram illustrating an example of the detailed configuration of a multiple-primary color conversion unit 22 included in the signal conversion circuit 20.
Figure 14:
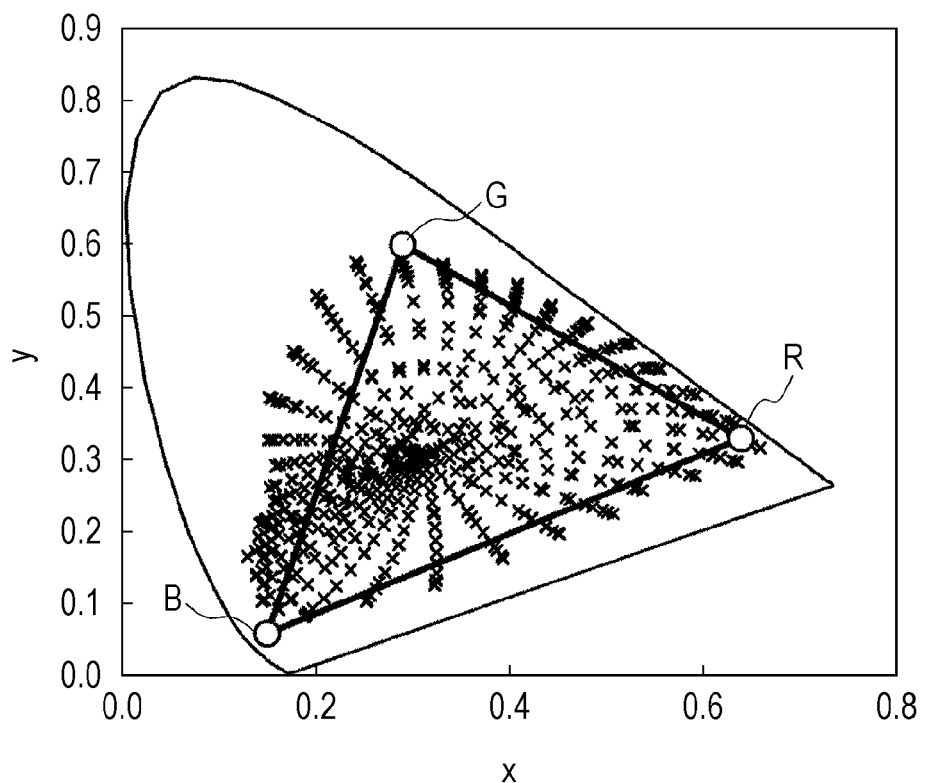
FIG. 14 is an xy chromaticity diagram illustrating the color reproduction range of a conventional display device which performs display using three primary colors.
Figure 15:
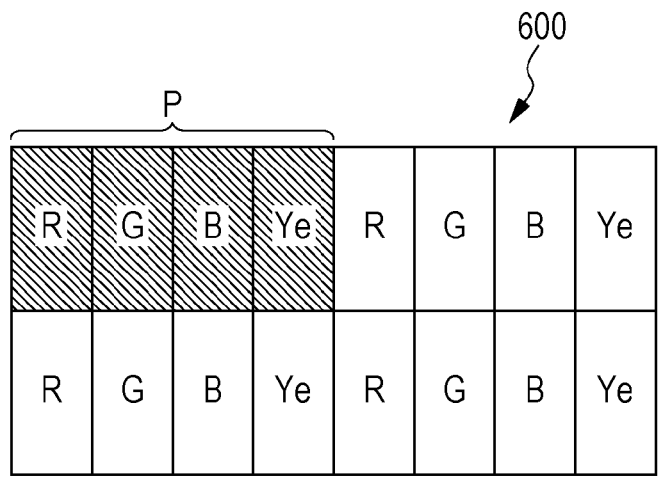
FIG. 15 is a view schematically illustrating a multiple-primary color liquid crystal display device 600 according to the related art.
Figure 16:
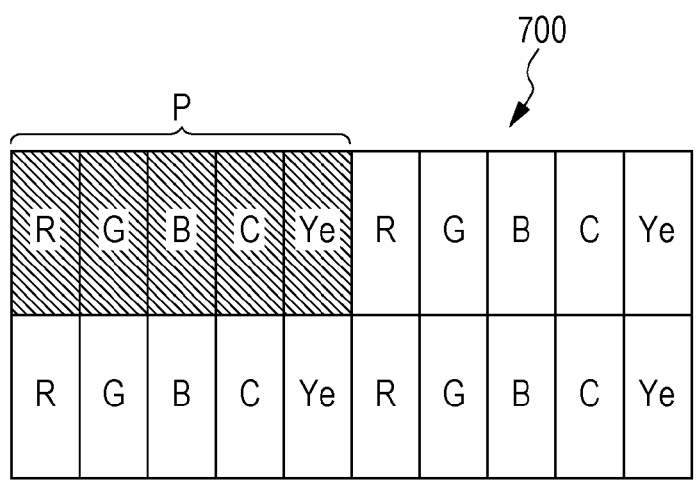
FIG. 16 is a view schematically illustrating a multiple-primary color liquid crystal display device 700 according to the related art.
Figure 17:
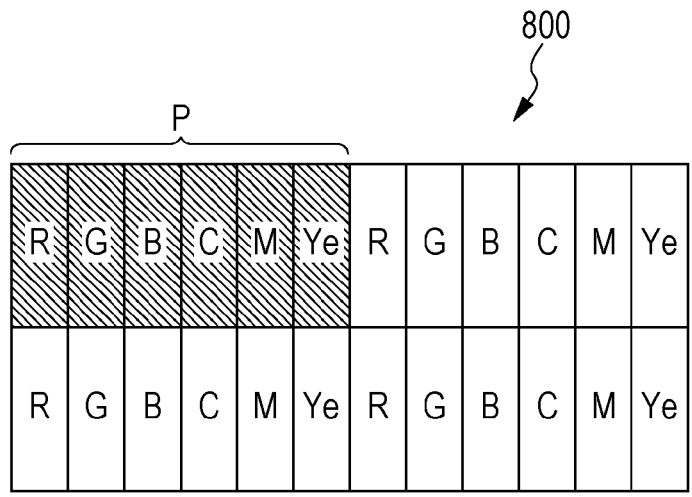
FIG. 17 is a view schematically illustrating a multiple-primary color liquid crystal display device 800 according to the related art.

The multiple-primary color conversion unit 22 generates a multiple-primary color video signal based on an input three-primary color video signal. Here, the multiple-primary color conversion unit 22 generates a multiple-primary color video signal based on the basic algorithm which has been described with reference to FIGS. 3 and 4. FIG. 13 illustrates an example of the detailed configuration of the multiple-primary color conversion unit 22. The multiple-primary color conversion unit 22 illustrated in FIG. 13 is configured with a color component extraction unit 22a and a gray scale level distribution unit 22b.

Figure 3:
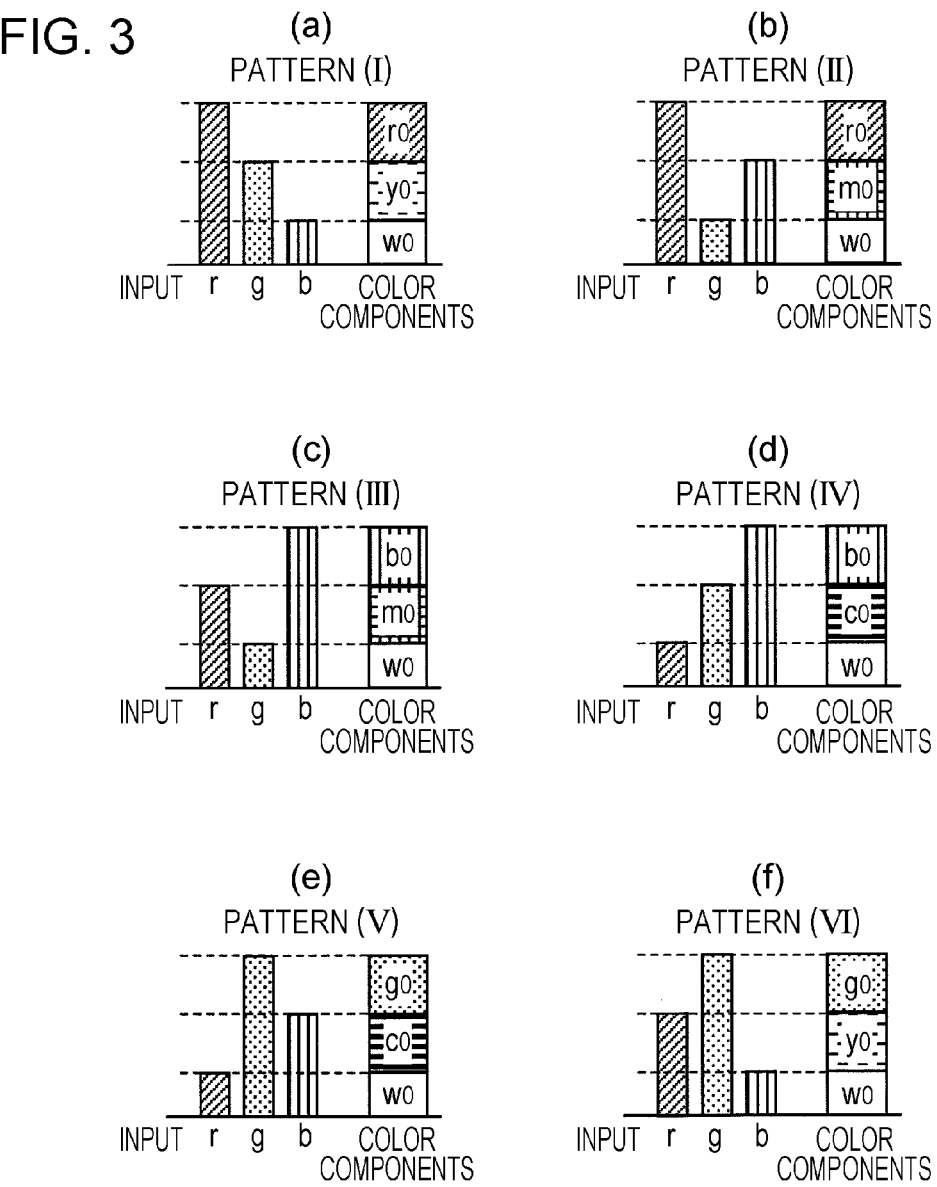
FIGS. 3(a) to 3(f) are views illustrating the relationships between a red gray-scale level r, a green gray-scale level g and a blue gray-scale level b, which are displayed based on an input three-primary color video signal, and extracted color components.

As described with reference to FIG. 3, the color component extraction unit 22a extracts seven color components, more specifically, a red component, a green component, a blue component, a yellow component, a magenta component, a cyan component, and a white component from the input three-primary color video signal. The three-primary color video signal is classified into six patterns (for example, the patterns (I) to (VI) which have been described in advance) based on the magnitude relationship between the gray scale levels r, g, and b of red, green, and blue. The respective gray scale levels $r_0$, $g_0$, $b_0$, $y_0$, $m_0$, $c_0$, and $w_0$ of the red component, the green component, the blue component, the yellow component, the magenta component, the cyan component, and the white component are computed for the respective patterns as described in advance.

As described with reference to FIG. 4, the computed gray scale levels of the color components are sorted into relevant sub pixels by the gray scale distribution unit 22b. The gray scale level $r_0$ of the red component is sorted into the red-sub pixel R, and the gray scale level $g_0$ of the green component is sorted into the green-sub pixel G. The gray scale level $b_0$ of the blue component is sorted into the blue-sub pixel B, and the gray scale level $y_0$ of the yellow component is sorted into the red-sub pixel R, the green-sub pixel G, and the yellow-sub pixel Ye. The gray scale level $m_0$ of the magenta component is sorted into the red-sub pixel R and the blue-sub pixel B, and the gray scale level $c_0$ of the cyan component is sorted into the green-sub pixel G and the blue-sub pixel B. The gray scale level $w_0$ of the white component is sorted into all the sub pixels.

Accordingly, if the gray scale levels of the red, the green, the blue, and the yellow (the gray scale levels before being input to the correction unit 24) which are displayed by the multiple-primary color video signal are set to $r_1$, $g_1$, $b_1$, and $y_1$, the gray scale levels $r_1$, $g_1$, $b_1$, and $y_1$ are expressed using Equations (1) to (4) which have been described in advance.

The correction unit 24 corrects the red gray-scale level $r_1$, the green gray-scale level $g_1$, and the yellow gray-scale level $y_1$ which are displayed by the multiple-primary color video signal which is obtained by the multiple-primary color conversion unit 22. In the example illustrated in FIG. 12, the correction unit 24 corrects the red gray-scale level $r_1$, the green gray-scale level $g_1$, and the yellow gray-scale level $y_1$ with reference to the LUT 26.

The LUT 26 includes a correction value according to the gray scale level $y_0$ of the yellow component which is extracted by the color component extraction unit 22a. In the case of r>g>b, the correction value is basically set so as to increase the yellow gray-scale level $y_1$ and decrease the green gray-scale level $g_1$. For example, a correction value is back-calculated such that the relationships illustrated in FIGS. 6 and 8 (further preferably, FIGS. 7 and 9) are realized, and included in the LUT 26.

The correction unit 24 performs addition and subtraction on the red gray-scale level $r_1$, the green gray-scale level $g_1$, and the yellow gray-scale level $y_1$ based on the correction value of the LUT 26. Meanwhile, the correction unit 24 may perform arbitrary color correction, gamma adjustment, or the like. In addition, as described in advance, when the gray scale level $y_0$ of the yellow component which is extracted by the color component extraction unit 22a is equal to or greater than 1 and equal to or less than 200, it is preferable to perform correction such that the gray scale level of the yellow-sub pixel Ye is higher than the gray scale level of the green-sub pixel G.

It is possible to realize the configuration elements included in the signal conversion circuit 20 by hardware, and it is possible to realize a part of or all of the configuration elements by software. When the configuration elements are realized by software, the configuration elements may be configured using a computer. The computer includes a Central Processing Unit (CPU) in order to execute various kinds of programs, a Random Access Memory (RAM) which functions as a work area in order to execute the programs, or the like. Further, the programs in order to realize the functions of the respective configuration elements are executed in the computer, and the computer operates each of the configuration elements.

In addition, the programs may be supplied from recording media to the computer, or may be supplied to the computer via a communication network. The recording media may be configured to be detachable from the computer, and may be mounted on the computer. The recording media may be mounted on the computer such that the computer can directly read recorded program code, and may be mounted to be read through a program reading apparatus which is connected to the computer as an external storage apparatus. As the recording media, it is possible to use, for example, tapes such as a magnetic tape, a cassette tape, and the like: discs which include a magnetic disc such as flexible disk/hard disc or the like, a magneto-optical disc such as MO, MO, and the like, and an optical disc such as a CD-ROM, a DVD, a CD-R, and the like: cards such as an IC card (including a memory card), an optical card, and the like: or semiconductor memories such as a mask ROM, an Erasable Programmable Read Only Memory (EPROM), an Electrically Erasable Programmable Read Only Memory (EEPROM), a flash ROM, and the like. In addition, when a program is supplied via a communication network, the program may have the form of carrier waves or data signals which are implemented by electrically transmitting the program codes thereof.

INDUSTRIAL APPLICABILITY

According to the present invention, the signal conversion circuit which is suitably used for the multiple-primary color liquid crystal display device is supplied. Since the chromaticity shift to the green side, obtained when observed from the oblique direction, is suppressed, the multiple-primary color liquid crystal display device which includes the signal conversion circuit according to the invention can perform high-definition display, thereby being suitably used for various kinds of electronic apparatuses including a liquid crystal television.

REFERENCE SIGNS LIST

10 liquid crystal display panel
20 signal conversion circuit
22 multiple-primary color conversion unit
22a color component extraction unit
22b gray scale distribution unit
24 correction unit
26 look-up table (LUT)
100 liquid crystal display device
P pixel
R red-sub pixel
G green-sub pixel
B blue-sub pixel
Ye yellow-sub pixel

The invention claimed is:

1. A signal conversion circuit which is used for a multiple-primary color liquid crystal display device that includes pixels each configured with a red-sub pixel, a green-sub pixel, a blue-sub pixel, and yellow-sub pixel, and that performs color display using four primary colors of red displayed by the red-sub pixel, green displayed by the green-sub pixel, blue displayed by the blue-sub pixel, and yellow displayed by the yellow-sub pixel, and which is configured to convert an input three-primary color video signal into a multiple-primary color video signal corresponding to the four primary colors, wherein the signal conversion circuit performs signal conversion such that a gray scale level of the yellow-sub pixel is higher than a gray scale level of the green-sub pixel in at least some cases from among cases in which a red gray-scale level r, a green gray-scale level g, and a blue gray-scale level b which are displayed by the three-primary color video signal satisfy a relationship of r>g>b, each of the red-sub pixel, the green-sub pixel, the blue-sub pixel, and the yellow-sub pixel can perform display 256 gray-scale levels from a gray scale level of 0 to a gray scale level of 255, each of the red gray-scale level r, the green gray-scale level g, and the blue gray-scale level b, which are displayed by the three-primary color video signal, is equal to or greater than 0 and equal to or less than 255, at least some cases include a case in which the red gray-scale level r is 255 and the green gray-scale level g is equal to or greater than 1 and equal to or less than 128, and in a case in which the red gray-scale level r is 255 and the green gray-scale level g is equal to or greater than 1 and equal to or less than 128, The signal conversion is performed such that the gray scale level of the green-sub pixel becomes equal to or less than 80.

2. The signal conversion circuit according to claim 1, wherein, in the case in which the red gray-scale level r is 255 and the green gray-scale level g is equal to or greater than 1 and equal to or less than 128, the signal conversion is performed such that the gray scale level of the green-sub pixel becomes 0.

3. The signal conversion circuit according to claim 1, wherein, in at least some cases, the signal conversion circuit performs the signal conversion such that a color, obtained when the pixel is viewed from a front direction when display is performed based on the multiple-primary color video signal, is substantially equal to a color obtained when the pixel is viewed from a 60° oblique direction.

4. A multiple-primary color liquid crystal display device comprising:
a signal conversion circuit according to claim 1; and
a liquid crystal display panel to which a multiple-primary color video signal generated by the signal conversion circuit is sent.

5. The multiple-primary color liquid crystal display device according to claim 4,
wherein the liquid crystal display panel includes a vertical alignment type liquid crystal layer, and includes the red-sub pixel, the green-sub pixel, the blue-sub pixel, and the yellow-sub pixel, and
wherein, in each of the red-sub pixel, the green-sub pixel, the blue-sub pixel, and the yellow-sub pixel, when a predetermined voltage is applied to the liquid crystal layer, liquid crystal molecules which are included in the liquid crystal layer incline to a plurality of orientations.

6. A signal conversion circuit which is used for a multiple-primary color liquid crystal display device that includes pixels each configured with a red-sub pixel, a green-sub pixel, a blue-sub pixel, and yellow-sub pixel, and that performs color display using four primary colors of red displayed by the red-sub pixel, green displayed by the green-sub pixel, blue displayed by the blue-sub pixel, and yellow displayed by the yellow-sub pixel, and which is configured to convert an input three-primary color video signal into a multiple-primary color video signal corresponding to the four primary colors, wherein the signal conversion circuit performs signal conversion such that a gray scale level of the yellow-sub pixel is higher than a gray scale level of the green-sub pixel in at least some cases from among cases in which a red gray-scale level r, a green gray-scale level g, and a blue gray-scale level b which are displayed by the three-primary color video signal satisfy a relationship of r>g>b, each of the red-sub pixel, the green-sub pixel, the blue-sub pixel, and the yellow-sub pixel can perform display 256 gray scale levels from the gray scale level of 0 to the gray scale level of 255, each of the red gray-scale level r, the green gray-scale level g, and the blue gray-scale level b, which are displayed by the three-primary color video signal, is equal to or greater than 0 and equal to or less than 255, at least some cases include a case in which the red gray-scale level r is 80 and the green gray-scale level g is equal to or greater than 1 and equal to or less than 40, and in a case in which the red gray-scale level r is 80 and the green gray-scale level g is equal to or greater than 1 and equal to or less than 40, the signal conversion is performed such that the gray scale level of the green-sub pixel becomes equal to or less than 25.

7. The signal conversion circuit according to claim 6, wherein, in the case in which the red gray-scale level r is 80 and the green gray-scale level g is equal to or greater than 1 and equal to or less than 40, the signal conversion is performed such that the gray scale level of the green-sub pixel becomes 0.

8. The signal conversion circuit according to claim 6, wherein, in at least some cases, the signal conversion circuit performs the signal conversion such that a color, obtained when the pixel is viewed from a front direction when display is performed based on the multiple-primary color video signal, is substantially equal to a color obtained when the pixel is viewed from a 60° oblique direction.

9. A multiple-primary color liquid crystal display device comprising:
    a signal conversion circuit according to claim 6; and
    a liquid crystal display panel to which a multiple-primary color video signal generated by the signal conversion circuit is sent.

10. The multiple-primary color liquid crystal display device according to claim 9, wherein
    the liquid crystal display panel includes a vertical alignment type liquid crystal layer, and includes the red-sub pixel, the green-sub pixel, the blue-sub pixel, and the yellow-sub pixel, and
    in each of the red-sub pixel, the green-sub pixel, the blue-sub pixel, and the yellow-sub pixel, when a predetermined voltage is applied to the liquid crystal layer, liquid crystal molecules which are included in the liquid crystal layer incline to a plurality of orientations.

11. A signal conversion circuit which is used for a multiple-primary color liquid crystal display device that includes pixels each configured with a red-sub pixel, a green-sub pixel, a blue-sub pixel, and yellow-sub pixel, and that performs color display using four primary colors of red displayed by the red-sub pixel, green displayed by the green-sub pixel, blue displayed by the blue-sub pixel, and yellow displayed by the yellow-sub pixel, and which is configured to convert an input three-primary color video signal into a multiple-primary color video signal corresponding to the four primary colors, wherein the signal conversion circuit performs signal conversion such that a gray scale level of the yellow-sub pixel is higher than a gray scale level of the green-sub pixel in at least some cases from among cases in which a red gray-scale level r, a green gray-scale level g, and a blue gray-scale level b which are displayed by the three-primary color video signal satisfy a relationship of r>g>b, the signal conversion circuit comprising:
    a multiple-primary color conversion unit that generates the multiple-primary color video signal based on the input three-primary color video signal; and
    a correction unit that corrects a red gray-scale level $r_1$, green gray-scale level $g_1$, signal obtained by the multiple-primary color conversion unit, the multiple-primary color conversion unit includes a color component extraction unit which extracts a red component, a green component, a blue component, a yellow component, a magenta component, a cyan component, and a white component from the input three-primary color video signal, and at least some cases in which the signal conversion is performed such that the gray scale level of the yellow-sub pixel is higher than the gray scale level of the green-sub pixel include a case in which the gray scale level $y_0$ of the yellow component extracted by the color component extraction unit is equal to or greater than 1 and equal to or less than 200.

12. The signal conversion circuit according to claim 11, further comprising:
    a look-up table that includes a correction value corresponding to a gray scale level $y_0$ of the yellow component which is extracted by the color component extraction unit,
    wherein the correction unit corrects the red gray-scale level $r_1$, the green gray-scale level $g_1$, and the yellow gray-scale level $y_1$ with reference to the look-up table.

13. The signal conversion circuit according to claim 11, wherein, in at least some cases, the signal conversion circuit performs the signal conversion such that a color, obtained when the pixel is viewed from a front direction when display is performed based on the multiple-primary color video signal, is substantially equal to a color obtained when the pixel is viewed from a 60° oblique direction.

14. A multiple-primary color liquid crystal display device comprising:
    a signal conversion circuit according to claim 11; and
    a liquid crystal display panel to which a multiple-primary color video signal generated by the signal conversion circuit is sent.

15. The multiple-primary color liquid crystal display device according to claim 14, wherein
    the liquid crystal display panel includes a vertical alignment type liquid crystal layer, and includes the red-sub pixel, the green-sub pixel, the blue-sub pixel, and the yellow-sub pixel, and
    in each of the red-sub pixel, the green-sub pixel, the blue-sub pixel, and the yellow-sub pixel, when a predetermined voltage is applied to the liquid crystal layer, liquid crystal molecules which are included in the liquid crystal layer incline to a plurality of orientations.

* * * * *